United States Patent
Yamanaka et al.

(10) Patent No.: US 7,134,863 B2
(45) Date of Patent: Nov. 14, 2006

(54) MOLD CLAMPING MECHANISM FOR INJECTION MOLDING MACHINE

(75) Inventors: Katsuyuki Yamanaka, Yamanashi (JP); Koichi Nishimura, Susono (JP); Shingo Okada, Yamanashi (JP); Naruhiro Nishimura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 70 days.

(21) Appl. No.: 11/098,473

(22) Filed: Apr. 5, 2005

(65) Prior Publication Data

US 2005/0233029 A1     Oct. 20, 2005

(30) Foreign Application Priority Data

Apr. 5, 2004    (JP)    ............... 2004-111355

(51) Int. Cl.
    *B29C 45/64*    (2006.01)
(52) U.S. Cl. ............... 425/190; 425/593; 425/595
(58) Field of Classification Search ............... 425/190, 425/593, 595, 451.6, 451.9
    See application file for complete search history.

(56) References Cited

U.S. PATENT DOCUMENTS

| | | | | |
|---|---|---|---|---|
| 3,674,400 A | * | 7/1972 | Sauerbruch et al. | ........ 425/225 |
| 3,841,823 A | * | 10/1974 | Hehl | ........ 425/450.1 |
| 4,530,655 A | * | 7/1985 | Hehl | ........ 425/589 |
| 4,571,169 A | * | 2/1986 | Shima et al. | ........ 425/451.9 |
| 5,511,963 A | * | 4/1996 | Hehl | ........ 425/190 |
| 2004/0043104 A1 | * | 3/2004 | Nishimura et al. | ........ 425/595 |

FOREIGN PATENT DOCUMENTS

| | | | |
|---|---|---|---|
| EP | 612601 | * | 8/1994 |
| JP | 7-195473 | * | 8/1995 |
| JP | 9-262884 | | 10/1997 |

* cited by examiner

Primary Examiner—James P. Mackey
(74) Attorney, Agent, or Firm—Staas & Halsey LLP

(57) ABSTRACT

Jack-up bolts are provided at two places along the rear platen movement direction on both sides of a lower part of a rear platen of an injection molding machine. The jack-up bolt engages threadedly with a bolt hole formed in the rear platen, and a lower end face of the jack-up bolt abuts on the upper surface of a slide plate to support the rear platen. A fixing bolt is inserted in a through hole formed in the jack-up bolt, and is threadedly engaged with a tap hole provided in the slide plate, by which the rear platen and the slide plate are integrated. The rear platen moves while being supported by the slide plate. When the tilt of the rear platen is corrected, the fixing bolt is loosened and the jack-up bolt is turned, by which a distance between the rear platen and the slide plate is adjusted.

2 Claims, 1 Drawing Sheet

MOLD CLAMPING MECHANISM FOR INJECTION MOLDING MACHINE

BACKGROUND OF THE INVENTION

1. Field of the Invention The present invention relates to a mold clamping mechanism for an injection molding machine and, more particularly, to the prevention of a tilt of a rear platen constituting a part of a mold clamping mechanism.

2. Description of the Prior Art

For an injection molding machine, mold opening/closing and mold clamping are performed by moving a movable platen to which a movable-side mold is attached toward a fixed platen to which a fixed-side mold is attached. During the time when the movable platen moves toward the fixed platen, the surface of the movable-side mold must be in parallel with the surface of the fixed-side mold. For this purpose, the movable platen must move in a posture parallel with the fixed platen. If the parallelism between the movable platen and the fixed platen breaks down, the parallelism between the fixed-side mold and the movable-side mold is naturally lost, which exerts an influence on the accuracy of molded product.

Thereupon, in order to obtain a molded product with high-accuracy, it is necessary to maintain the parallelism of the movable platen with the fixed platen and to restrain the loss of parallelism in the mold opening/closing operation.

To restrain the loss of parallelism, a method has conventionally been used in which the tilt of the movable platen in the advance direction is corrected by adjusting a roller, a sliding bearing, or the like that supports the movable platen, by which the parallelism between the movable platen and the fixed platen is maintained.

For a toggle type mold clamping mechanism using a toggle mechanism, in order to maintain the parallelism between the movable platen and the fixed platen with higher accuracy, it is necessary to correct the tilt of a rear platen in addition to the tilt of the movable platen.

The position of center of gravity of the whole of the rear platen and the toggle mechanism shifts to the movable platen side due to the influence of a toggle mechanism component such as a toggle link constituting the toggle mechanism. Therefore, the rear platen is prone to tilt to the movable platen side. This tilt of the rear platen exerts an influence on the tilt of the movable platen via the toggle link and tie bars that are provided between the fixed platen and the rear platen to guide the movable platen. Also, if the tilt of movable platen is corrected forcibly by the roller, the sliding bearing, or the like that supports the movable platen in a state in which the rear platen tilts, the parallelism between the rear platen and the movable platen breaks down, so that an unbalanced load acts on the tie bars and the toggle mechanism, and thus partial wear is liable to occur. As a result, the parallelism between the fixed platen and the movable platen breaks down.

A method is known in which an eccentric shaft that supports the movable platen on a bearing fixed to a linear guide unit is provided, and the tilt of movable platen is adjusted by this eccentric shaft. Also, a method of adjusting the rear platen in the same way as the adjustment of the tilt of movable platen is also known (refer to Japanese Patent-Application Laid-Open No. 9-262884).

As described above, the tilt of rear platen resultantly exerts an influence on the parallelism between the movable platen and the fixed platen. Therefore, in the case where the tilt is corrected by the linear guide unit and the eccentric shaft as described in Japanese Patent Application Laid-Open No. 9-262884, there arises a problem in that the linear guide unit becomes large and complicated. The linear guide unit is required to have a construction enough to withstand a vertical load caused by the deformation of the rear platen at the time of mold clamping. For this purpose, the linear guide unit must have a large size and a complicated construction, which increases the cost. The use of linear guide unit can be thought for a component that moves at a high speed like the movable platen. The aforementioned Publication describes the adjustment of the tilt of movable platen using the linear guide unit and the eccentric shaft, and merely describes the additional applicability of this adjusting method to the rear platen. However, since the rear platen does not move at a high speed, there is little need for using the expensive linear guide unit.

SUMMARY OF THE INVENTION

In a first aspect of the present invention, a toggle type mold clamping mechanism for an injection molding machine includes a slide plate provided to be slidable with respect to a base frame of the injection molding machine, and a jack-up bolt threadedly mounted in two or more locations along the movement direction of a rear platen constituting the toggle type mold clamping mechanism on both sides of a lower part of the rear platen. In this mold clamping mechanism, a lower end face of the jack-up bolt abuts on the bottom face of an engagement hole provided in the slide plate to support the rear platen.

In a second aspect of the present invention, a toggle type mold clamping mechanism for an injection molding machine includes a slide plate provided to be slidable with respect to a base frame of the injection molding machine, and a jack-up bolt threadedly mounted in two or more locations along the movement direction of a rear platen constituting the toggle type mold clamping mechanism on both sides of a lower part of the rear platen. In this mold clamping mechanism, a through hole through which a fixing bolt is inserted is provided at the center of the jack-up bolt, and a tap hole threadedly engaged with the fixing bolt is provided in the slide plate; and a lower end face of the jack-up bolt abuts on the face of the slide plate to support the rear platen, and the slide plate is fixed to the jack-up bolt via the fixing bolt.

According to the present invention having the above-described configuration, there can be provided a mold clamping mechanism for an injection molding machine, in which a tilt of a rear platen can be corrected by a low-cost and simple construction, and a high-accuracy molded product can be produced by increasing the stability at the time of mold opening/closing.

BRIEF DESCRIPTION OF THE DRAWINGS

These and other objects and advantages of the present invention will be clarified by reference to the following description of embodiment, taken in connection with the accompanying drawings, in which.

DETAILED DESCRIPTION OF THE PREFERRED EMBODIMENTS

Figure 1:
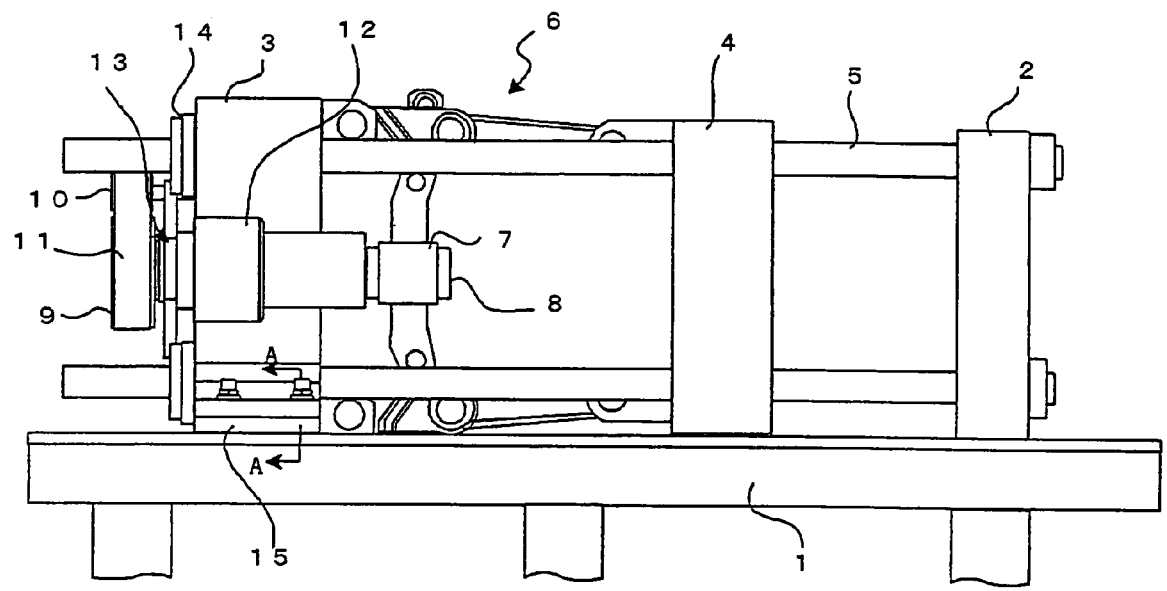
FIG. 1 is a schematic explanatory view of one embodiment of a mold clamping mechanism in accordance with the present invention.

FIG. 1 is a schematic explanatory view of one embodiment of a mold clamping mechanism in accordance with the present invention.

On a base frame 1 of an injection molding machine, a fixed platen 2 is fixed. This fixed platen 2 is connected to a rear platen 3 by a plurality of tie bars 5. Between the fixed platen 2 and the rear platen 3, a movable platen 4 is arranged. Also, between the rear platen 3 and the movable platen 4, a toggle mechanism 6 is disposed. By the drive of this toggle mechanism 6, the movable platen 4 is guided along the tie bars 5, and slides forward and rearward (in the right-and-left direction in FIG. 1) on the base frame 1, by which molds (not shown in FIG. 1) attached to the fixed platen 2 and the movable platen 4 are opened/closed and clamped.

A nut is fixed on a crosshead 7 of the toggle mechanism 6, and a ball screw 8 threadedly engaged with this nut is supported on the rear platen 3 so as to be rotatable and axially immovable. Between a driven pulley 9 attached to one end of the ball screw 8 and a driving pulley 10 attached to a motor shaft of a mold clamping servomotor (not shown) provided on the rear platen 3, a timing belt 11 is set. When the mold clamping servomotor is driven, the ball screw 8 is rotated via the driving pulley 10, the timing belt 11, and the driven pulley 9. The rotation of the ball screw 8 moves the nut threadedly engaged with the ball screw 8 forward and rearward in the axial direction, and also moves the crosshead 7 integral with the nut forward and rearward, so that a toggle link constituting the toggle mechanism 6 is expanded and contracted to move the movable platen 4 forward and rearward, by which the molds are opened/closed and clamped.

Also, threads are formed in a rear end part (left side in FIG. 1) of each of the tie bars 5, and a rotating member 14 formed by integrating a nut engaged with the threads with a gear is attached to the rear platen 3 so as to be rotatable and axially immovable. The rotating member 14 is driven via a gear transmission mechanism 13 by a motor 12 for adjusting the thickness of mold, which is provided on the rear platen 3. In a toggle type mold clamping mechanism, the position of the rear platen 3 must be adjusted according to the thickness of mold and a set mold clamping force. Specifically, the position of the rear platen 3 is adjusted so that when the toggle link of the toggle mechanism 6 is extended to form a lockup state, a set clamping force is generated on the mold to be used. The position of the rear platen 3 is adjusted by driving the motor 12 for adjusting the thickness of mold and thereby rotating the rotating member 14 by means of the gear transmission mechanism 13 to slide the rear platen forward and rearward on the top surface of the base frame 1 along the tie bars 5.

As described above, it is necessary to adjust the position of the rear platen 3 (to adjust the thickness of mold) according to the thickness of mold and the set clamping force. In this embodiment, a slide plate 15 or the like is used to slidably support the rear platen 3 on the base frame 1.

Figure 2:
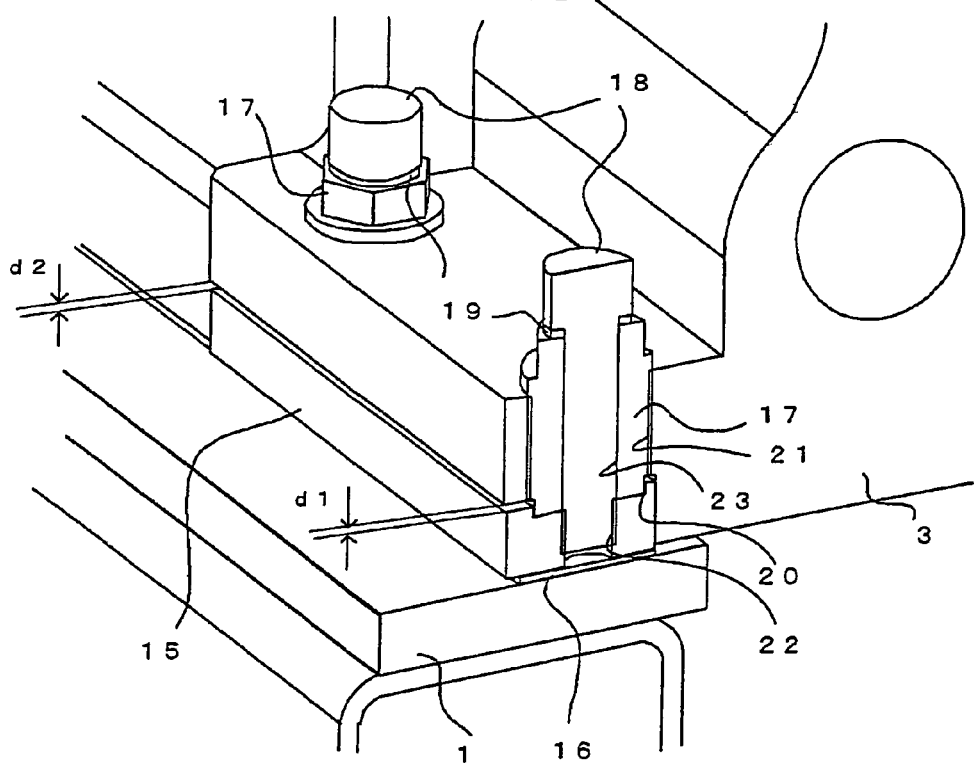
FIG. 2 is a sectional view taken along the line A—A of FIG. 1.

FIG. 2 is a sectional view taken along the line A—A of FIG. 1, showing a portion in which the rear platen 3 is supported on the base frame 1.

In a part of the base frame 1, a slide plate receiving member 16 is provided. The slide plate 15 is placed on the slide plate receiving member 16. In the upper surface of the slide plate 15, two or more (two in the example shown in FIG. 2) engagement holes 20 for receiving jack-up bolts 17 are formed at intervals in the movement direction of the rear platen 3 (advance-and-retreat direction, right-and-left direction in FIG. 1). On the other hand, in a lower part of the rear platen 3, bolt holes 21 are provided, each of which engages threadedly with the jack-up bolt 17 engaged with the engagement hole 20 in the slide plate 15.

Further, in the engagement hole 20 in the slide plate 15, a tap hole 22 is formed at the center thereof. Also, at the center of the jack-up bolt 17, a through hole 23 through which a fixing bolt 18 is inserted in the axial direction is formed. The fixing bolt 18 is passed through the through hole 23 in the jack-up bolt 17 and the tip end portion of the fixing bolt 18 is screwed in the tap hole 22, by which the jack-up bolt 17 is pressed on the slide plate 15 side. Reference numeral 19 denotes a washer.

A slide mechanism for the rear platen 3 consisting of the slide plate 15, the plurality of jack-up bolts 17, and the like is provided on both sides, right and left, of the rear platen 3 with respect to the movement direction thereof. As necessary, this slide mechanism may additionally be provided in a central part of the rear platen 3. In this embodiment, the slide mechanism is provided on both sides, right and left, of the rear platen 3 with respect to the movement direction thereof. The slide mechanism includes two jack-up bolts 17 provided along the movement direction of the rear platen 3. Therefore, the rear platen 3 is supported on the base frame 1 via the slide plate 15 by a total of four jack-up bolts 17 whose lower end faces each abut on the bottom face of the engagement hole 20 in the slide plate 15.

When the motor 12 for adjusting the thickness of mold is driven, the slide plate 15, together with the rear platen 3, moves slidingly on the surface of the slide plate receiving member 16.

In order to correct the tilt of the rear platen 3, the fixing bolts 18 are loosened and the jack-up bolts 17 are turned to change the threaded engagement position between the slide plate 15 and the jack-up bolt 17, by which distances d1 and d2 between the slide plate 15 and the rear platen 3 are adjusted. Specifically, two jack-up bolts 17 provided along the movement direction of the rear platen 3 are turned, by which the distances d1 and d2 between the slide plate 15 and the rear platen 3 are adjusted, thereby correcting the tilt in the movement direction of the rear platen 3.

In this embodiment, the fixing bolts 18 are provided. However, the fixing bolts 18 need not be provided necessarily. A force for moving the rear platen 3 by the drive of the motor 12 for adjusting the thickness of mold is transmitted to the jack-up bolts 17 threadedly engaged with the rear platen 3. Since the jack-up bolt 17 is engaged with the engagement hole 20 in the slide plate 15, the force transmitted to the jack-up bolt 17 is transmitted to the slide plate 15. As a result, the rear platen 3 and the slide plates 15 integrally slide on the surface of the slide plate receiving member 16 on the base frame 1. Also, the tilt of the rear platen 3 is corrected by adjusting the distances d1 and d2 between the rear platen 3 and the slide plate 15 by turning the front and rear jack-up bolts 17.

However, in the case where the fixing bolts 18 are not provided, as described above, the rear platen 3 is merely supported by the lower end faces of the four jack-up bolts 17 abutting on the slide plates 15. Because this support area is small, the rear platen 3 is unstable against subtle vibrations at the time of mold opening/closing operation. Usually, the looseness of bolt etc. is prevented by using a locking nut or the like. However, even if the looseness is prevented, it is difficult to improve the unstableness because the support is provided by surface contact with a small support area.

Thereupon, in this embodiment, the fixing bolt 18 is used to integrate the rear platen 3, the jack-up bolt 17, the fixing bolt 18, and the slide plate 15. Thereby, the rear platen 3 is fixed firmly to the slide plates 15, and the rear platen 3 can be supported by the whole of bottom surfaces of the slide plates 15, so that the posture of the rear platen 3 is stable even at the time of mold opening/closing. In the case where the fixing bolts 18 are provided, the engagement holes 20 need not be provided necessarily because the slide plates 15, the jack-up bolts 17, and the rear platen 3 are integrated via the fixing bolts 18.

The invention claimed is:

1. A toggle type mold clamping mechanism for an injection molding machine, comprising:
    a slide plate provided to be slidable with respect to a base frame of the injection molding machine; and
    a jack-up bolt threadedly mounted in two or more locations along the movement direction of a rear platen constituting said toggle type mold clamping mechanism on both sides of a lower part of said rear platen, wherein
    a lower end face of said jack-up bolt abuts on the bottom face of an engagement hole provided in said slide plate to support said rear platen.

2. A toggle type mold clamping mechanism for an injection molding machine, comprising:
    a slide plate provided to be slidable with respect to a base frame of the injection molding machine; and
    a jack-up bolt threadedly mounted in two or more locations along the movement direction of a rear platen constituting said toggle type mold clamping mechanism on both sides of a lower part of said rear platen, wherein
    a through hole through which a fixing bolt is inserted is provided at the center of said jack-up bolt, and a tap hole threadedly engaged with said fixing bolt is provided in said slide plate, and
    a lower end face of said jack-up bolt abuts on the face of said slide plate to support said rear platen, and said slide plate is fixed to said jack-up bolt via said fixing bolt.

* * * * *

UNITED STATES PATENT AND TRADEMARK OFFICE
CERTIFICATE OF CORRECTION

| | | |
|---|---|---|
| PATENT NO. | : 7,134,863 B2 | Page 1 of 1 |
| APPLICATION NO. | : 11/098473 | |
| DATED | : November 14, 2006 | |
| INVENTOR(S) | : Katsuyuki Yamanaka et al. | |

It is certified that error appears in the above-identified patent and that said Letters Patent is hereby corrected as shown below:

Col. 1, line 6-10, before "The present invention relates to a mold clamping mechanism for an injection molding machine and, more particularly, to the prevention of a tilt of a rear platen constituting a part of a mold clamping mechanism.", insert an entry for a new paragraph.

Col. 1, line 62, change "Patent-" to --Patent--

Signed and Sealed this

Twenty-seventh Day of March, 2007

JON W. DUDAS
*Director of the United States Patent and Trademark Office*